(12) United States Patent
Hegar et al.

(10) Patent No.: US 8,615,371 B2
(45) Date of Patent: Dec. 24, 2013

(54) FUEL CONSUMPTION MEASUREMENT OF BUS HVAC UNITS

(75) Inventors: Michal Hegar, Prague (CZ); Marketa Kopecka, Vsetin (CZ); Antonin Ryska, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 247 days.

(21) Appl. No.: 13/087,423

(22) Filed: Apr. 15, 2011

(65) Prior Publication Data
US 2012/0265460 A1 Oct. 18, 2012

(51) Int. Cl.
*F25B 49/00* (2006.01)
*B60H 3/00* (2006.01)
*G21C 17/00* (2006.01)
*G01R 21/00* (2006.01)

(52) U.S. Cl.
USPC ............... 702/60; 702/113; 702/182; 701/36; 62/127

(58) Field of Classification Search
USPC ................. 702/60, 113, 182; 701/36; 62/127
See application file for complete search history.

(56) References Cited

U.S. PATENT DOCUMENTS

| | | | |
|---|---|---|---|
| 5,816,491 A | 10/1998 | Berkeley et al. | |
| 6,089,034 A | 7/2000 | Lake et al. | |
| 6,755,032 B1 | 6/2004 | Kotwicki et al. | |
| 7,007,491 B2 | 3/2006 | Grimm et al. | |
| 7,276,815 B2 | 10/2007 | Algrain et al. | |
| 7,779,616 B2 | 8/2010 | Sheidler et al. | |
| 7,845,187 B2 | 12/2010 | Patel et al. | |
| 7,861,547 B2 | 1/2011 | Major et al. | |
| 2004/0221594 A1* | 11/2004 | Suzuki et al. | 62/236 |
| 2006/0080976 A1 | 4/2006 | Markowitz et al. | |
| 2007/0186573 A1 | 8/2007 | Ziehr et al. | |

(Continued)

FOREIGN PATENT DOCUMENTS

| | | |
|---|---|---|
| DE | 10052898 A1 | 7/2001 |
| EP | 0933606 A2 | 8/1999 |

(Continued)

OTHER PUBLICATIONS

Translation of PL380881, R. Arkadiusz, Method for the Measurement of Fuel Consumption Recording Apparatus, Apr. 4, 2008.*

(Continued)

*Primary Examiner* — Alexander H Taningco
*Assistant Examiner* — L. Anderson
(74) *Attorney, Agent, or Firm* — Michael Best & Friedrich LLP

(57) ABSTRACT

The method includes operating an HVAC unit for a test period in an automatic temperature control mode and measuring power consumed at one or more testing heat loads at one or more rotational speeds. The method further includes determining an association between the measured power consumed at the one or more testing heat loads and one or more tested bus engine speeds and calculating power consumed at the one or more testing heat loads at a plurality of profiled bus engine speeds based on the association, wherein the plurality of profiled bus engine speeds is derived from a bus road profile of known bus engine speeds at known time durations, with the known time durations summing to a time period. The method also includes calculating energy consumed at the one or more testing heat loads over the time period.

23 Claims, 7 Drawing Sheets

(56) References Cited

U.S. PATENT DOCUMENTS

| | | | |
|---|---|---|---|
| 2009/0007856 A1* | 1/2009 | Minekawa | 123/41.11 |
| 2009/0229288 A1 | 9/2009 | Alston et al. | |
| 2010/0011789 A1 | 1/2010 | Carlson et al. | |
| 2010/0082499 A1 | 4/2010 | Luff | |

FOREIGN PATENT DOCUMENTS

| | | |
|---|---|---|
| JP | 2010145309 | 7/2010 |
| PL | 378736 | 4/2007 |
| PL | 380881 | 4/2008 |
| WO | 2010048036 | 4/2010 |
| WO | 2010114460 | 10/2010 |

OTHER PUBLICATIONS

Translation of PL378736, Method for the Measurement of the Fuel Consumption in the Internal Combustion Engine Coupled with a Power Generator and a System for the Measuring Fuel Consumption in the Internal Combustion Engine Coupled With a Power Generator, K. Leszek, Apr. 16, 2007.*

"Directive 2009/33/EC 2009 of The European Parliament and of The Council of Apr. 23, 2009 on the Promotion of Clean and Energy-Efficient Road Transport Vehicles," Official Journal of the European Union, May 15, 2009, 8 pages.

Pitchaikani Anand, Jebakumar Kingsly, Venkataraman Shankar, Sundaresan S.A., "Real-time Drive Cycle Simulation of Automotive Climate Control System," Proceedings 7th Modelica Conference, Como, Italy, Sep. 20-22, 2009, 8 pages.

Ryska A., Kral F., Ota J, "Method of Determination of the Effective Capacity of Refrigeration and A/C Units of Variable Speeds," International Journal of Refrigeration, 2000, pp. 402-405, vol. 23.

"UITP Project 'SORT' Standardised On-Road Tests Cycles," brochure, 2009, 36 pages, International Association of Public Transport, Brussels, Belgium.

"Fuel Consumption Measurement Method for Vehicle Powered Refrigeration Units Based on a Concept of Standard Vehicle Engine," WP.11/2007/63rd/INF.3, description of the test, Nov. 12-15, 2007, 8 pages, United Nations Economic Commission for Europe, Inland Transport Committee, Geneva, Switzerland.

"ANSI/ASHRAE Standard 37-2009, Methods of Testing for Rating Electrically Driven Unitary Air-Conditioning and Heat Pump Equipment," Sep. 2009, 34 pages, American Society of Heating, Refrigerating and Air-Conditioning Engineers, Inc., Atlanta, Georgia.

* cited by examiner

| Road Profile Definition | | | | | | Road Profile $\sum t_R$ | 1 hour Road Profile |
|---|---|---|---|---|---|---|---|
| Bus cycle: | Idle | High idle | C.B.D. | Arterial | Commuter | | |
| Bus Engine Speed $n_{BR}$ [RPM] | 500 | 1000 | 1250 | 1700 | 1850 | | |
| Duration $t_R$ [s]: | 701 | 300 | 1197.0 | 375.2 | 257.0 | 2830.0 | 3600.0 |
| Route [km]: | | | | | | 21.4 | 27.2 |

FIG. 5

| Compressor Power Consumption $P_{CR}$ at standard BUS speeds [kW] | | | | | |
|---|---|---|---|---|---|
| Heat Load $\dot{Q}_\%$ [%] | Bus Engine Speed $n_{BR}$ [RPM] | | | | |
| | 500 | 1000 | 1250 | 1700 | 1850 |
| 30 | 1.4 | 2.1 | 2.4 | 3.0 | 3.1 |
| 40 | 1.7 | 2.6 | 3.2 | 4.2 | 4.4 |
| 50 | 2.4 | 3.4 | 4.1 | 5.1 | 5.3 |

FIG. 6a

| Fans Power Consumption $P_{FR}$ at standard BUS speeds [kW] | | | | | |
|---|---|---|---|---|---|
| Heat Load $\dot{Q}_\%$ [%] | Bus Engine Speed $n_{BR}$ [RPM] | | | | |
| | 500 | 1000 | 1250 | 1700 | 1850 |
| 30 | 0.9 | 0.7 | 0.6 | 0.6 | 0.6 |
| 40 | 1.0 | 0.8 | 0.7 | 0.7 | 0.7 |
| 50 | 1.2 | 0.9 | 0.8 | 0.8 | 0.8 |

FIG. 6b

| Nominal cooling capacity $\dot{Q}_0$ [kW] | Relative Heat Load Level [%] | Heat Load $\dot{Q}_\%$ [kW] | One Hour Fuel Consumption $C_{R1}$ [l/h] | Fuel consumption per HVAC unit lifetime $C_R$ [l] | Specific One Hour Fuel Consumption $c_R$ [l/(kW·h)] |
|---|---|---|---|---|---|
| 25 | 30 | 7.5 | 0.93 | 22,421 | 0.108 |
|  | 40 | 10.0 | 1.06 | 25,386 | 0.107 |
|  | 50 | 12.5 | 1.30 | 31,315 | 0.105 |

FUEL CONSUMPTION MEASUREMENT OF BUS HVAC UNITS

BACKGROUND

The present invention relates to a method of determining energy consumption, and more particularly to a method of determining energy consumption of bus heating, ventilating, and air conditioning (HVAC) units.

SUMMARY

Conventional methods of testing HVAC equipment are suitable for certain types of equipment in certain environments. For example, ANSI/ASHRAE Standard 37-2009, "Methods of Testing for Rating Electrically Driven Unitary Air-Conditioning and Heat Pump Equipment," applies to electrically driven mechanical-compression unitary air conditioners and heat pumps that consist of one or more assemblies having an indoor air coil, a compressor, and an outdoor coil. Evaluating the cooling capacity performance of HVAC equipment is accomplished through, for example, measuring the air flow and air enthalpy difference across the evaporator, or measuring the refrigerant mass flow and refrigerant enthalpy difference through the evaporator. For bus and/or rail HVAC unit testing, such measurements of cooling capacity commonly occur at maximum compressor speeds.

A more effective way to calculate the energy consumption of a bus HVAC unit is to measure the bus engine increase in fuel consumption during the operation period of the HVAC unit. But measuring cooling capacity at maximum compressor speed, and with the evaporator and condenser fans in high speed mode due to maximum cooling capacity requirements, is not always a sufficient basis for calculating the bus engine fuel consumption because most air-conditioned buses equipped with HVAC units power the HVAC unit through the bus engine. Specifically, the HVAC compressor is either driven directly from the engine using a belt, or with electric or hydraulic power transmission. The bus HVAC unit compressor speed consequently varies depending on the bus operating conditions. Properly comparing the efficiency of various bus HVAC units requires measuring the HVAC unit fuel consumption dependent on bus engine speed and therefore should be determined using a road profile based on established variations of bus engine speed with time. Because the bus engine-powered HVAC unit has no direct fuel consumption, its energy consumption can be determined by first evaluating the HVAC unit power input measured under specific conditions and then recalculating these results in terms of a bus engine fuel consumption increment when the HVAC unit is in operation. Such a method can be used as a comparative energy consumption test procedure under realistic bus HVAC unit operating conditions that avoid deficiencies of calculations based on standard cooling capacity tests centered on nominal performance.

In one embodiment, a method for determining the energy consumption of a bus heating, ventilating, and air conditioning (HVAC) unit uses a testing system having a volume simulating a bus internal volume. The HVAC unit includes a refrigerant compressor and a fan for moving air. The refrigerant compressor is configured to operate at one or more rotational speeds, with the one or more rotational speeds corresponding to a multiple of one or more tested bus engine speeds. The testing system is operable to apply one or more testing heat loads to the simulated bus internal volume. The method includes operating the HVAC unit for a test period and measuring power consumed by the compressor at at least one of a first testing heat load and a second testing heat load at one or more rotational speeds. The method further includes measuring power consumed by the fan at the at least one of a first testing heat load and the second testing heat load at each of the one or more rotational speeds, determining an association between (a) each of the measured power consumed by the compressor and the measured power consumed by the fan at the at least one of a first testing heat load and a second testing heat load and (b) one or more tested bus engine speeds, and calculating power consumed by the compressor and power consumed by the fan at the at least one of a first testing heat load and a second testing heat load at a plurality of profiled bus engine speeds based on the association, wherein the plurality of profiled bus engine speeds is derived from a bus road profile of known bus engine speeds at known time durations, with the known time durations summing to a time period. The method also includes calculating energy consumed as energy consumed by the compressor and energy consumed by the fan at the at least one of a first testing heat load and a second testing heat load over the time period.

In another embodiment, a method for determining the energy consumption of a bus heating, ventilating, and air conditioning (HVAC) unit uses a testing system having a volume simulating a bus internal volume. The HVAC unit includes a refrigerant compressor and a fan for moving air. The refrigerant compressor is configured to operate at one or more rotational speeds, with the one or more rotational speeds corresponding to a multiple of one or more tested bus engine speeds. The testing system is operable to apply one or more testing heat loads to the simulated bus internal volume during a test period. The HVAC unit includes an automatic temperature control mode in which the refrigerant compressor is on for a portion of the test period and off for a portion of the test period. The method includes operating the HVAC unit for the test period in the automatic temperature control mode and measuring power consumed by the compressor at one or more testing heat loads at one or more rotational speeds. The method further includes determining an association between the measured power consumed by the compressor at the one or more testing heat loads and one or more tested bus engine speeds and calculating power consumed by the compressor at the one or more testing heat loads at a plurality of profiled bus engine speeds based on the association, wherein the plurality of profiled bus engine speeds is derived from a bus road profile of known bus engine speeds at known time durations, with the known time durations summing to a time period. The method also includes calculating energy consumed by the compressor at the one or more testing heat loads over the time period.

Other aspects of the invention will become apparent by consideration of the detailed description and accompanying drawings.

BRIEF DESCRIPTION OF THE DRAWINGS

FIG. 5 is an example road profile in accordance with an embodiment of the present invention.

FIG. 6a is a chart of compressor power consumption for the road profile of FIG. 5.

FIG. 6b is a chart of fan power consumption for the road profile of FIG. 5.

DETAILED DESCRIPTION

Before any embodiments of the invention are explained in detail, it is to be understood that the invention is not limited in its application to the details of construction and the arrangement of components or steps set forth in the following description or illustrated in the following drawings. The invention is capable of other embodiments and of being practiced or of being carried out in various ways.

Figure 1:
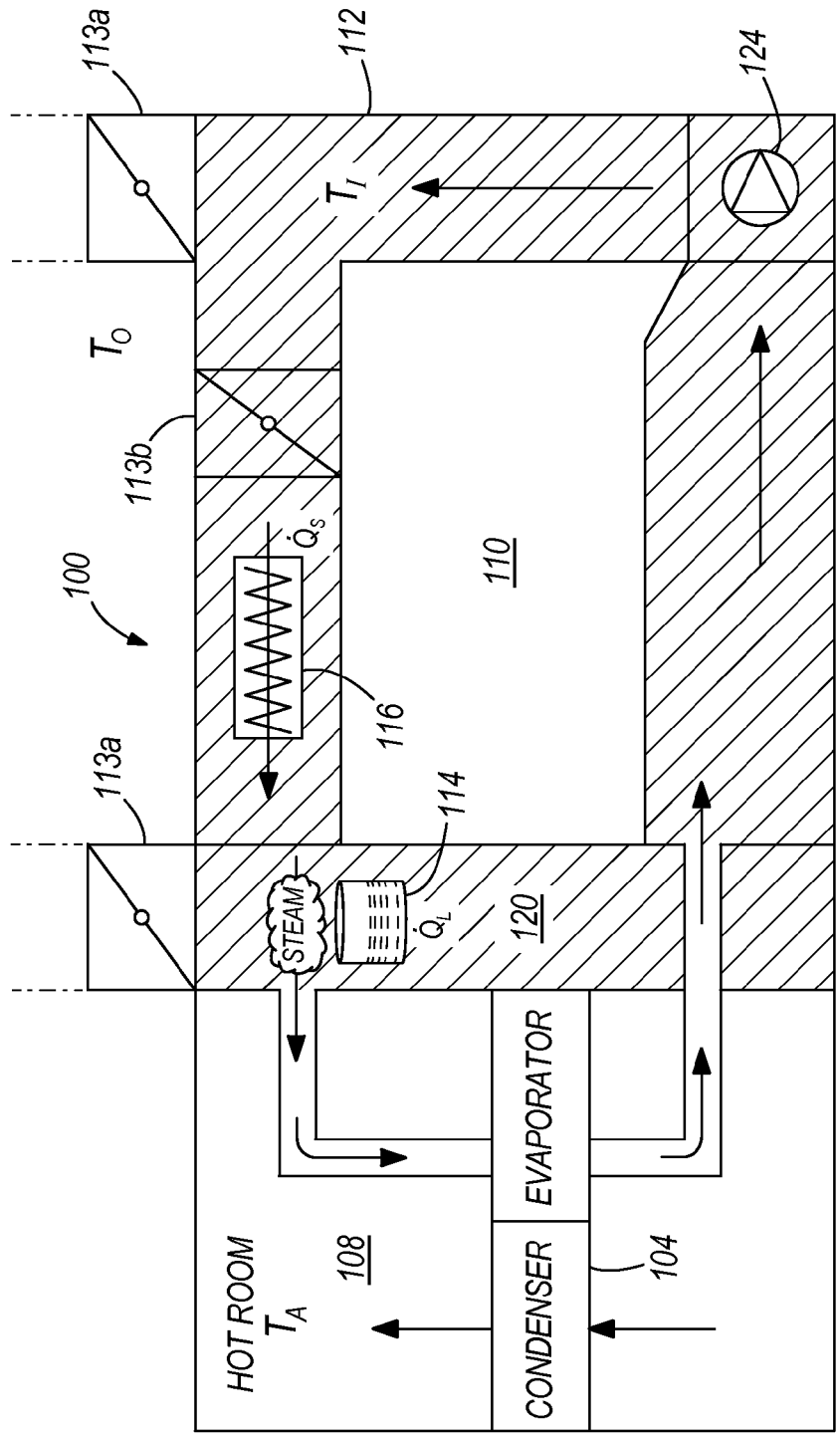
FIG. 1 is a schematic of the testing system in accordance with an embodiment of the present invention.

FIG. 1 illustrates the testing system 100 developed for the fuel consumption test. The testing system includes a hot room 108 and a test room 110 with a testing line 112. The HVAC unit 104 to be tested is installed in the hot room 108 of the testing system 100. The HVAC unit 104 includes components well known to those of ordinary skill in the art and includes a refrigerant line with a compressor for compressing the refrigerant, an evaporator coil, a condenser coil, and an expansion valve. The HVAC unit also includes one or more evaporator fans for passing a portion of the air within the testing line 112 over the evaporator coil and one or more condenser fans for passing a portion of the air within the hot room 108 over the condenser coil. A technology room, not shown, maintains the hot room 108 at a controlled ambient temperature $T_A$.

To properly test the bus HVAC unit, the testing line 112 within the test room 110 must accurately simulate the internal volume of the bus to be modeled. An appropriately sized testing line and system can be constructed for this specific purpose, or, alternatively, a standard testing system for HVAC unit air-flow and cooling capacity testing can be modified as necessary. As an example of the latter, a new air-duct line (testing line) specifically sized for bus HVAC unit testing could be placed in parallel with an existing air-duct line used for standard cooling capacity testing, such as that used with ANSI/ASHRAE Standard 37-2009 testing described above. With properly positioned dampers, such as dampers 113a and 113b in FIG. 1, closed off or open as necessary to isolate the existing air-duct line from the newly configured system, operation in either standard testing mode or the mode of the presently described embodiment can be accomplished. For illustration, the volume of the testing line 112, represented by the hatched pattern in FIG. 1, represents the internal volume of the bus being modeled. In either case, a testing line 112 with an internal volume of approximately 50 m³ is used in the presently described embodiment, but the testing line is configurable and modifiable with variable dimensions to accurately represent a wide range of tested bus sizes, to include larger buses such as tourist buses.

The tested unit 104 is connected with the testing line 112 in the test room 110. A testing heat load $\dot{Q}_{\%}$ is generated in testing line 112 in order to represent realistic heat loads for the tested unit as would be experienced in a bus on the road. The testing heat load $\dot{Q}_{\%}$ is defined as a percentage of the rated nominal cooling capacity $\dot{Q}_O$ at the maximum compressor speed of the HVAC unit 104.

The testing heat load $\dot{Q}_{\%}$ consists of two parts, a latent heat load $\dot{Q}_L$ and a sensible heat load $\dot{Q}_S$, represented as:

$$\dot{Q}_{\%} = \dot{Q}_L + \dot{Q}_S \tag{1}$$

The latent heat load $\dot{Q}_L$ represents the energy required to dehumidify the air, i.e., absorb the heat of vaporization of the moisture in the air. Within a bus, this is related to the humidity produced by passengers in the bus. Within the testing line 112, latent heat is simulated by a latent heat source 114, such as evaporating water, in a mixing room 120. The latent heat load $\dot{Q}_L$, which represents a presumed number of passengers in the bus, can be defined as 10% of the rated nominal cooling capacity $\dot{Q}_O$. This definition is based on an assumption that the size of the tested HVAC unit 104 is directly proportional to the expected number of passengers, though other assumptions could of course be utilized.

The sensible heat load $\dot{Q}_S$ represents the energy required to lower the temperature of the air and corresponds to heat gain from passengers, heat gain due to heat transfer through the bus walls, and heat gain from solar radiation. Heat related to any fresh air load, for example through door infiltration when the bus door is opened, is not simulated in the present embodiment. The sensible heat load source 116, which consists of heating bars or other like source, is installed in the testing line 112 and the heat provided is controlled by regulating the power input to the sensible heat load source, $P_S$. Specifically, the power input $P_S$ to the sensible heat load source is controlled in dependence on the required testing heat load $\dot{Q}_{\%}$, latent heat load $\dot{Q}_L$, duct testing line heat gain $\dot{Q}_G$, and the duct line fan input power $P_L$, as described below:

$$P_S = \dot{Q}_{\%} - \dot{Q}_L - \dot{Q}_G - P_L \tag{2}$$

The requested sensible heat load $\dot{Q}_S$ is generally maintained at a constant level independent of any system changes caused by the control strategy, to be described below. The duct line fan input power $P_L$ is continuously monitored as a function of the variable supply frequency of the duct line fan 124. The testing line heat gains $\dot{Q}_G$ can be calculated from measured inside temperatures $T_I$ and outside temperatures $T_O$ of the testing line 112, the heat transfer surface $S_L$ of the testing line 112, and the known heat transfer coefficient $k_L$ of the testing line 112:

$$\dot{Q}_G = k_L \times S_L \times (T_O - T_I) \tag{3}$$

During testing, the tested unit 104 operates in an automatic mode based on a requested setpoint $T_S$. HVAC unit power consumption $P_U$ is preferably measured at three testing heat load levels, though more than three heat levels are certainly contemplated with the described embodiment. These levels are defined as a percentage of the rated nominal cooling capacity $\dot{Q}_O$, for example, $\dot{Q}_{30\%}$, $\dot{Q}_{40\%}$, and $\dot{Q}_{M\%}$ representing 30%, 40%, and a maximal heat load. The maximal heat load, $\dot{Q}_{M\%}$, is estimated in advance of testing through cooling capacity measurements at a specific ambient temperature $T_A$ within the hot room 108, for example $T_A=35°$ C., and a specific setpoint temperature $T_S$, for example $T_S=27°$ C. A relative humidity of 50% is used to establish $\dot{Q}_{M\%}$ at an idle bus engine speed of 500 RPM. In the described embodiment, the maximal heat load $\dot{Q}_{M\%}$ could, for example, correspond to 50% of the rated nominal cooling capacity $\dot{Q}_O$, or $\dot{Q}_{50\%}$. The maximal heat load $\dot{Q}_{M\%}$, can, however, be any percentage up to and including the rated nominal cooling capacity $\dot{Q}_O$, i.e., $\dot{Q}_{0\%}$ to $\dot{Q}_{100\%}$. The HVAC unit power consumption $P_U$ can therefore be calculated, as will be further detailed, as a function of the testing heat load level $\dot{Q}_{\%}$.

The compressor of the tested unit 104 is installed on a compressor test stand and operates at a requested constant rotational speed $n_C$ (further detailed below). The rotation speed n and torque τ of the compressor are measured using equipment suitable for the purpose, such as an optical speed sensor and torque transducer. Because the compressor speed of the bus HVAC unit is directly related to the engine speed of the bus, as earlier described, a relationship must be established between realistic bus engine speeds and the consequent speed of the compressor to accurately establish the requested constant speed $n_C$. To do that in the presently described embodiment, four engine testing speeds $n_B$ are used as a basis, 500 RPM, 1000 RPM, 1500 RPM, and 1900 RPM, though fewer than four, more than four, or differently valued engine speeds are certainly possible. A speed ratio between the bus engine and the unit HVAC compressor is obtained according to actual operational parameters of the bus. As an example, if the speed ratio λ between the bus engine speeds provided and the HVAC compressor speed is 1.3, the testing compressor rotational speed $n_C$ is adjusted based on this multiple of the four engine testing speeds of 500, 1000, 1500, and 1900 RPM to 650, 1300, 1950, and 2470 RPM, respectively.

For testing, the ambient temperature $T_A$ in the hot room 108 is kept at approximately $T_A=35°$ C., while the specific setpoint temperature $T_S$ of the HVAC unit 104 is adjusted to $T_S=27°$ C. The relative humidity is influenced by the latent heat $\dot{Q}_L$ and varies with the status of the compressor during testing (ON or OFF). The presently described embodiment, however, is not limited to any particular values of $T_A$, $T_S$, or relative humidity during testing.

Figure 2:
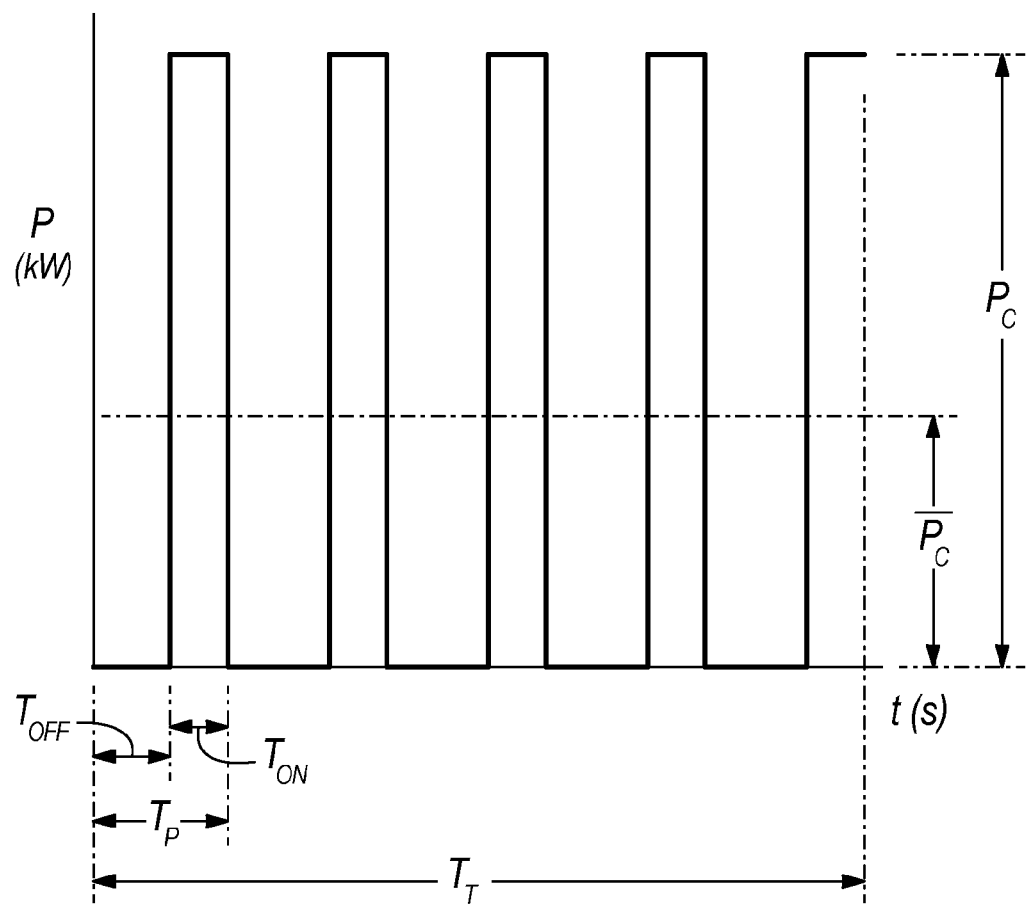
FIG. 2 is a chart of the operation of the compressor of the system illustrated in FIG. 1.

The tested unit 104 operates in automatic temperature control mode for one hour after reaching the setpoint temperature $T_S$ for each of the tested conditions. In this mode, the compressor automatically switches ON and OFF, with the evaporator and condenser fan(s) (not shown in FIG. 1) speed dependent on the HVAC unit controller. FIG. 2 illustrates the operation of the compressor over time. The test period $T_P$, as described in equation (4), consists of time $T_{ON}$ (compressor is switched ON) and time $T_{OFF}$ (compressor is switched OFF):

$$T_P = T_{ON} + T_{OFF} \quad (4)$$

The total unit operation time $T_T$ during the test is calculated from the number of measured periods (for example, five (5) in FIG. 2) and the test period $T_P$:

$$T_T = T_P \times (\text{number of measured periods}) \quad (5)$$

A time ratio $T_R$ between the overall compressor ON time $T_{ON}$ and the total unit operation time $T_T$ is calculated as in equation (6):

$$T_R = \Sigma T_{ON}/T_T \quad (6)$$

The instant compressor input power (power consumption) $P_C$ is calculated from the measured rotation speed n of the compressor and the compressor torque τ as:

$$P_C = 2 \times \pi \times (n/60) \times \tau \quad (7)$$

The mean compressor input power $\overline{P_C}$ is calculated as in equation (8) from the instant compressor input power $P_C$ and the time ratio $T_R$:

$$\overline{P_C} = P_C \times T_R \quad (8)$$

Evaporator fan and condenser fan input power, $P_F$, is calculated from the measured supply voltage V and the measured current I across the evaporator fans and condenser fans, as in equation (9):

$$P_F = V \times I \quad (9)$$

Figure 3B:
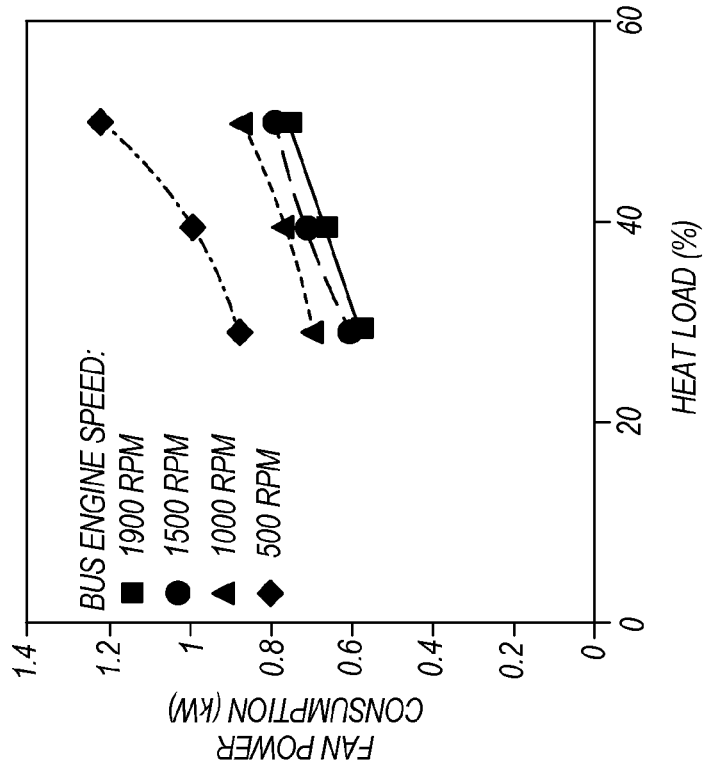
FIG. 3b is a chart of the fan power consumption vs. heat load for the evaporator and condenser fans of the system illustrated in FIG. 1.
Figure 3A:
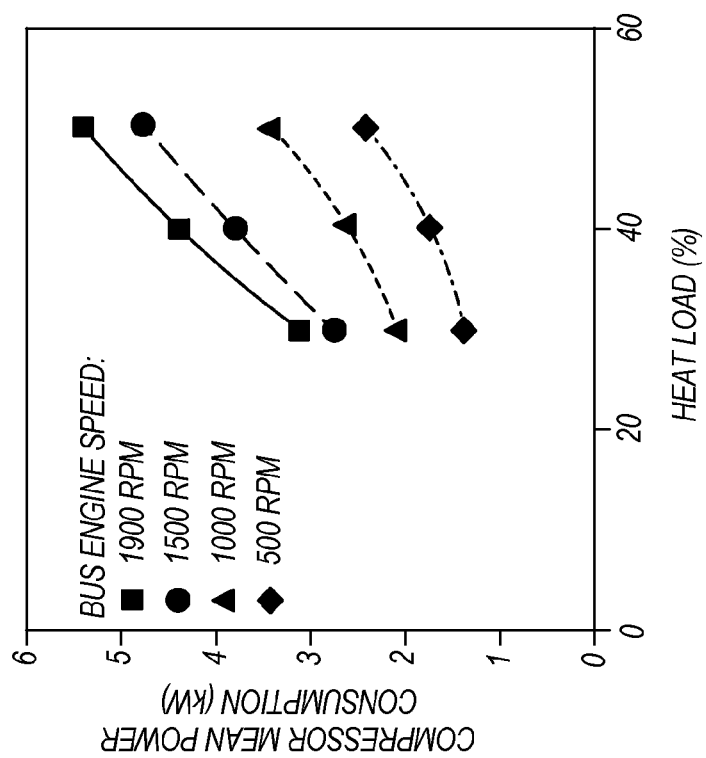
FIG. 3a is a chart of the compressor mean power consumption vs. heat load for the compressor of the system illustrated in FIG. 1.

From the calculated test output data the compressor mean power consumption $\overline{P_C}$ and the fan power consumption $P_F$, for each testing heat load $\dot{Q}_{\%}$, (i.e., $\dot{Q}_{30\%}$, $\dot{Q}_{40\%}$, etc.), is calculated for each bus engine speed $n_B$. FIG. 3a shows a chart of the test results of compressor mean power consumption $\overline{P_C}$ vs. heat load for three loads $\dot{Q}_{\%}$ and four bus engine speeds $n_B$. FIG. 3b shows a chart of the test results of fan power consumption $P_F$ vs. the same heat loads and same bus engine speeds as in FIG. 3a.

Figure 4B:
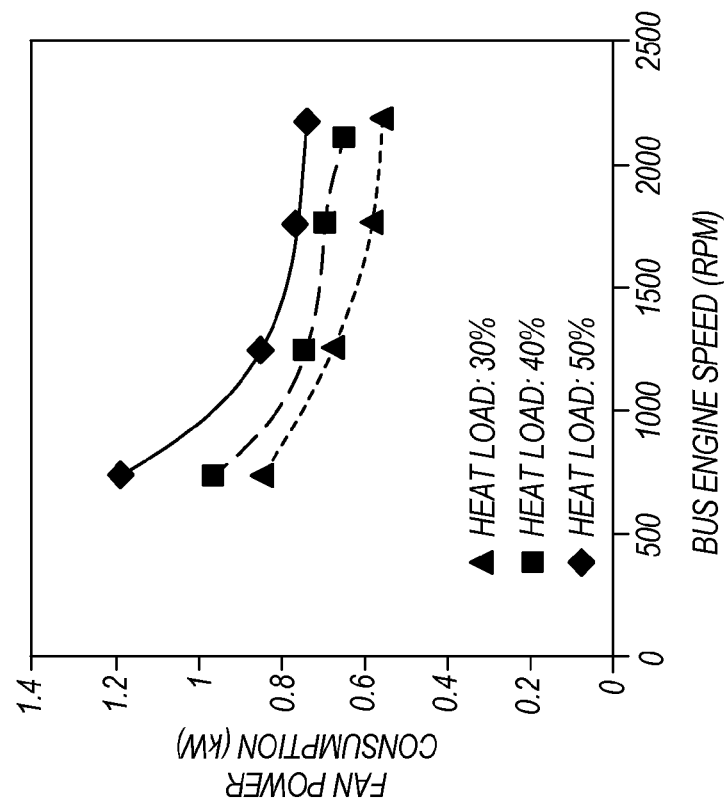
FIG. 4b is a chart of the fan power consumption vs. bus engine speed for the evaporator and condenser fans of the system illustrated in FIG. 1.
Figure 4A:
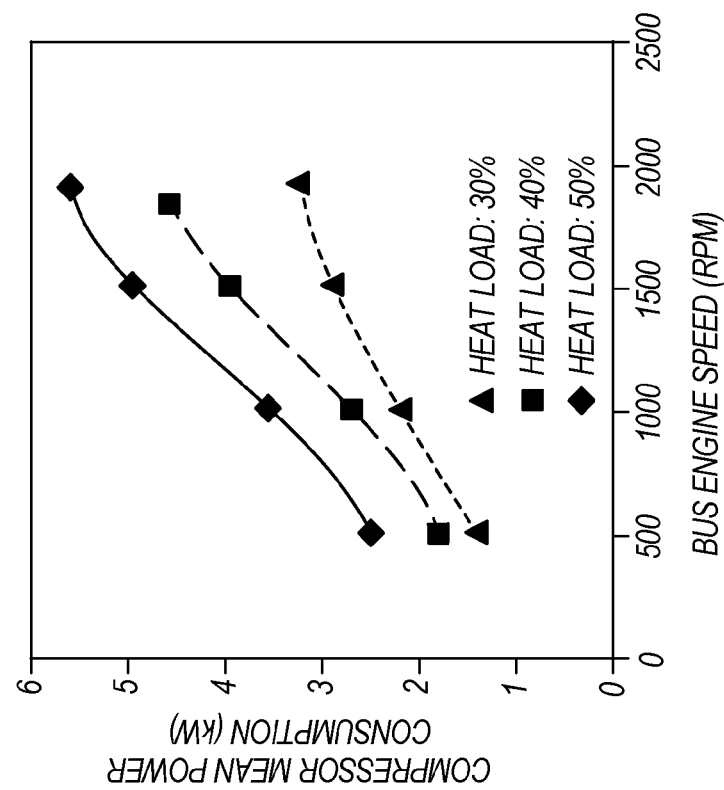
FIG. 4a is a chart of the compressor mean power consumption vs. bus engine speed for the compressor of the system illustrated in FIG. 1.

These results can be manipulated to obtain analytic functions of compressor mean power consumption $\overline{P_C}$ and fan power consumption $P_F$ dependent on the bus engine speed $n_B$ for each of the tested heat load levels $\dot{Q}_{\%}$. FIGS. 4a and 4b are such charts of compressor mean power consumption $\overline{P_C}$ and fan power consumption $P_F$, respectively, versus bus engine speed $n_B$.

Once established, these functions are utilizable for calculations of compressor and fan power consumption at particular bus speeds defined by a particular bus road profile. Bus engine speeds during operation can be obtained through publicly accessible real bus road profiles that are based upon actual measured data of variations of bus engine speed in time during a bus operating cycle. Multiple cycles together will constitute a usable bus road profile. Sources of bus operating cycle data are readily available, for example, the International Association of Public Transport produces, through Project SORT (Standardised On-Road Tests cycles), reproducible test cycles for on-road tests of buses in order to measure their fuel consumption. Other established cycles can be used to obtain a standard road profile definition, the degree of specificity of which can vary depending on the testing objectives. Referring to the table of FIG. 5, an example road profile consists of a mix of different cycles. For example, an Idle cycle represents time in which the bus is sitting still with the engine operating at approximately 500 RPM, while a High Idle represents time in which the bus is sitting still with the engine operating at approximately 1000 RPM. A City Bus Duty cycle (C.B.D.) represents acceleration of the bus to approximately 20 MPH over a certain time, e.g., 10 seconds, steady operation at 20 MPH for approximately 18-20 seconds, and deceleration within approximately 5 seconds. An Arterial cycle includes acceleration of the bus to approximately 40 MPH over approximately 30 seconds, steady operation at 40 MPH for 22-23 seconds, and deceleration within 9 seconds. A Commuter cycle includes acceleration to approximately 55 MPH over the course of 90 seconds followed by steady operation at 55 MPH for approximately 188 seconds, and deceleration within 9 seconds. The standard road profile of FIG. 5 provides typical bus engine speeds $n_{BR}$ with cycle durations $t_R$ for the particular bus cycle. As one or more of the aforementioned exemplary cycles occurs multiple times in varying order during the testing period, the positioning of durations $t_R$ within FIG. 5 does not represent a literal sequence of bus cycle operation, but a summation of time spent within each cycle within the road profile. FIG. 5 also indicates a distance traveled, in this case 21.4 kilometers, over the course of the road profile chosen, and a total duration of time consisting of the sum of durations $t_R$. As shown in the right-hand column of FIG. 5, this distance is proportionately extrapolated out over the course of an hour of travel, as further explained below.

Figure 7:
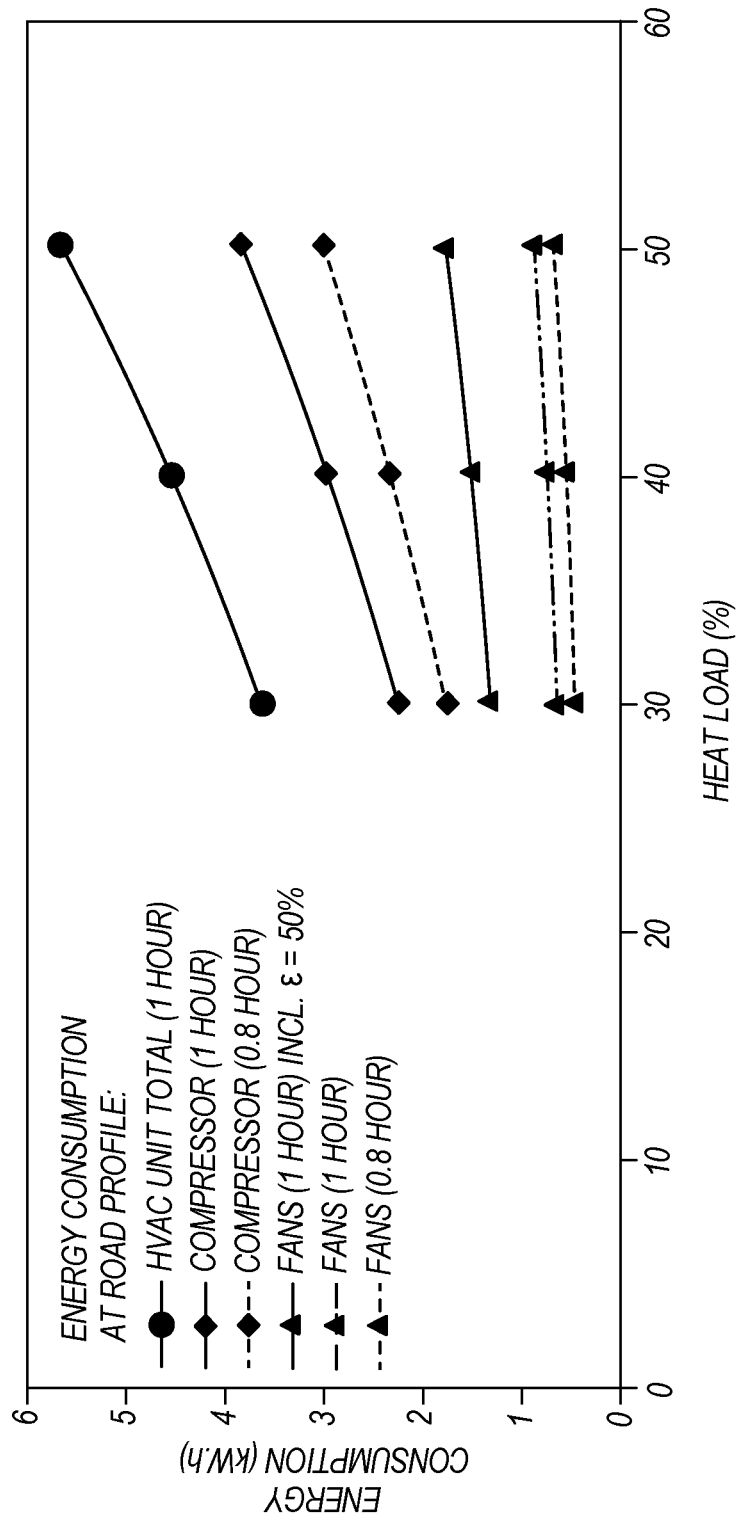
FIG. 7 is a chart of HVAC unit, compressor, and fan energy consumption in accordance with an embodiment of the present invention.

The test data of compressor mean power consumption $\overline{P_C}$ and fan power consumption $P_F$ are recalculated to compressor power consumption $P_{CR}$ and fan power consumption $P_{FR}$ for the particular road profile bus speeds $n_{BR}$ for each of the tested heat load levels $\dot{Q}_\%$. The tables of FIGS. 6a and 6b show these results, respectively. The test data can be recalculated, of course, according to any other road profile and for other heat load levels $\dot{Q}\%$ tested. Based on the relationship between energy, power, and time, the compressor power consumption $P_{CR}$ and fan power consumption $P_{FR}$ at the road profile can also be recalculated to compressor energy consumption $E_{CR}$ and fan energy consumption $E_{FR}$ over the course of the road profile, which in the presently described embodiment is approximately 0.8 hour (2830 s/3600 s from FIG. 5). These energy levels can also be proportionately extrapolated to a unit of time energy consumption of the compressor, $E_{CR1}$, and fans, $E_{FR1}$ for each heat load level $\dot{Q}_\%$. In the illustrated embodiment, a one-hour unit of time is used. The total unit of time HVAC unit energy consumption $E_R$ is obtained as the summation of the two. An example of the above energy consumptions over the course of the road profile and extrapolated to one hour vs. the corresponding heat load is shown in FIG. 7. Because the bus HVAC unit typically takes power from the vehicle alternator to power the electric fans, a vehicle alternator efficiency should be accounted for in the calculation of the fan energy consumption $E_{FR1}$. As shown in FIG. 7, a reasonable alternator efficiency estimation is approximately $\epsilon=50\%$. Other efficiencies are of course usable.

The data are recalculated to a unit of time HVAC unit diesel fuel consumption $C_{R1}$ at the prescribed road profile using the total unit of time HVAC unit energy consumption $E_{R1}$, a standard specific fuel consumption of a standard diesel engine $c_s$ and a standard diesel fuel density. For common diesel engines, a standard specific fuel consumption $c_s$ is typically about 165 g/(kW-h), and a standard diesel fuel density is 836 g/l. The calculation is set forth in equation (10):

$$C_{R1}=(E_{R1} \times c_s)/(836 \text{ g/l}) \quad (10)$$

The unit of time HVAC unit diesel consumption $C_{R1}$ at the prescribed road profile can also be used to express a fuel consumption $C_R$ per HVAC unit lifetime over the same road profile by defining a bus lifetime $t_B$ and average operation hours of the HVAC unit per year h, as in equation (11):

$$C_R=C_{R1} \times t_B \times h \quad (11)$$

Figures 8, 9:
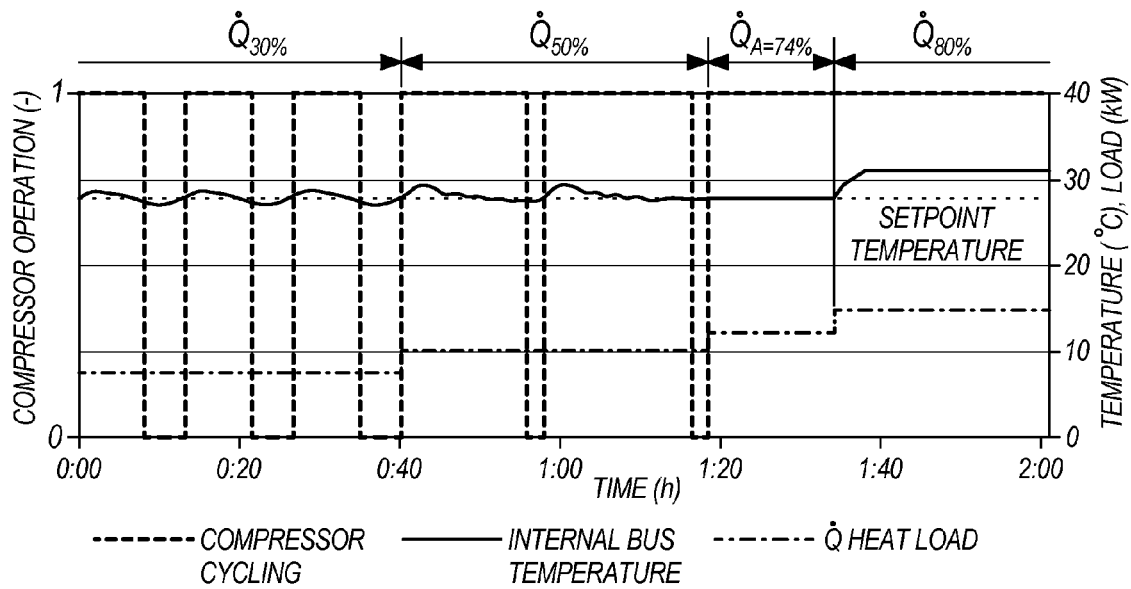
FIG. 8 is a chart of HVAC unit diesel fuel consumption in accordance with an embodiment of the present invention.
FIG. 9 is a chart of internal bus temperature over time for various heat loads in accordance with an embodiment of the present invention.

The table of FIG. 8 shows an example of HVAC unit diesel consumption at the road profile per HVAC unit lifetime, using values from operation of a bus equipped with an HVAC unit for $t_B$ of 12 years with average operation hours per year h of 2000 hours/year. The specific unit of time fuel consumption $c_R$, given in the last column of FIG. 8, represents a value usable for economy comparisons between different bus HVAC units. $c_R$ is based on the unit of time fuel consumption $C_{R1}$ divided by the corresponding heat load $\dot{Q}_\%$ as illustrated in equation (12):

$$c_R=C_{R1}/\dot{Q}_\% \quad (12)$$

The final results of the fuel consumption test for an adequate comparison of bus HVAC units are defined by two parameters. The first parameter is the unit of time specific fuel consumption at the particular road profile $c_R$, as described above. As an example, various bus HVAC units could be compared based on their specific unit of time fuel consumption at a heat load of $\dot{Q}_{40\%}$. The second parameter is the maximal allowed heat load $\dot{Q}_A$. The maximal allowed heat load $\dot{Q}_A$ is defined as a percentage of the rated nominal cooling capacity $\dot{Q}_O$ and it represents a limiting heat load with which the HVAC unit is able to maintain the requested temperature setpoint $T_S$ at given conditions through the entire range of the particular road profile. In other words, if the HVAC unit is operating with a mean compressor speed corresponding to a mean bus engine speed at the road profile, a maximal heat load exists at which the setpoint $T_S$ can be maintained. The mean bus engine speed $\overline{n_{BR}}$ for the road profile is calculated according to FIG. 5 using the bus engine speeds $n_{BR}$ and corresponding cycle durations $t_R$, as in equation (13):

$$\overline{n_{BR}}=\Sigma(n_{BR} \times t_R)/\Sigma t_R \quad (13)$$

For the particular road profile used in the presently described embodiment, $\overline{n_{BR}}$ calculates to 1150 RPM, but of course the value is ultimately strongly dependent on the particular road profile used.

If the testing heat load $\dot{Q}_\%$ were to be a greater value than maximal allowed heat load $\dot{Q}_A$ at $\overline{n_{BR}}$ the fuel test results will not be correct above the maximal allowed heat load $\dot{Q}_A$ because the internal bus temperature $T_B$ is increasing above the allowed temperature setpoint offset. FIG. 9 illustrates this concept on a real example of measured data. The maximal allowed heat load values of one or more bus HVAC units can then be compared.

The described method is applicable not only to bus HVAC units in which the compressor is driven directly from the bus engine, but to HVAC units driven from an engine alternator, a battery, or the like.

Various features and advantages of the invention are set forth in the following claims.

What is claimed is:

1. A method for determining the energy consumption of a bus heating, ventilating, and air conditioning (HVAC) unit using a testing system having a volume simulating a bus internal volume, the HVAC unit including a refrigerant compressor and a fan for moving air, the refrigerant compressor configured to operate at one or more rotational speeds, the one or more rotational speeds corresponding to a multiple of one or more tested bus engine speeds, the testing system operable to apply one or more testing heat loads to the simulated bus internal volume, the method comprising:
    operating the HVAC unit for a test period;
    measuring power consumed by the compressor at at least one of a first testing heat load and a second testing heat load at one or more rotational speeds;
    measuring power consumed by the fan at the at least one of a first testing heat load and a second testing heat load at each of the one or more rotational speeds;
    determining an association between (a) each of the measured power consumed by the compressor and the measured power consumed by the fan at the at least one of a first testing heat load and a second testing heat load and (b) one or more tested bus engine speeds;
    calculating power consumed by the compressor and power consumed by the fan at the at least one of a first testing heat load and a second testing heat load at a plurality of profiled bus engine speeds based on the association, wherein the plurality of profiled bus engine speeds is derived from a bus road profile of known bus engine speeds at known time durations, the known time durations summing to a time period; and
    calculating energy consumed as energy consumed by the compressor and energy consumed by the fan at the at least one of a first testing heat load and a second testing heat load over the time period.

2. The method of claim 1, wherein at least one of a first testing heat load and a second testing heat load means a first testing heat load and a second testing heat load.

3. The method of claim 1, further including the steps of:
measuring power consumed by the compressor at a third testing heat load at each of the one or more rotational speeds;
measuring power consumed by the fan at the third testing heat load at each of the one or more rotational speeds;
determining an association between (a) each of the measured power consumed by the compressor and the measured power consumed by the fan at the third testing heat load and (b) the one or more tested bus engine speeds;
calculating power consumed by the compressor and power consumed by the fan at the plurality of profiled bus engine speeds based on the association; and
calculating energy consumed by the compressor and energy consumed by the fan at the third testing heat load over the time period.

4. The method of claim 1, wherein the HVAC unit has a rated nominal cooling capacity at a maximum rotational speed of the compressor, and wherein one of the at least one of a first testing heat load and a second testing heat load represents a percentage of the rated nominal cooling capacity between about 20% of the rated nominal cooling capacity and about 80% of the rated nominal cooling capacity.

5. The method of claim 3, wherein the HVAC unit has a rated nominal cooling capacity at a maximum rotational speed of the compressor, and wherein one of the at least one of a first testing heat load and a second testing heat load represents a percentage of the rated nominal cooling capacity between about 20% of the rated nominal cooling capacity and about 80% of the rated nominal cooling capacity.

6. The method of claim 1, wherein the HVAC unit includes an automatic temperature control mode in which the refrigerant compressor is on for a portion of the test period and off for a portion of the test period, wherein operating the HVAC unit for a test period includes operating the HVAC unit in the automatic temperature control mode.

7. The method of claim 1, further including the step of calculating a unit of time energy consumed as the energy consumed over a unit of time.

8. The method of claim 7, further including the step of calculating, from the unit of time energy consumed, a unit of time HVAC unit fuel consumption.

9. The method of claim 8, further including calculating a specific unit of time fuel consumption by dividing the unit of time HVAC unit fuel consumption by one of the first testing heat load and the second testing heat load.

10. The method of claim 9, wherein the HVAC unit is a first HVAC unit, further including comparing the specific unit of time fuel consumption of the first HVAC unit with a specific unit of time fuel consumption of a second HVAC unit at the same one of the first testing heat load and the second testing heat load.

11. The method of claim 1, further including the step of determining maximal allowed heat load, wherein the maximal allowed heat load is defined as a limiting heat load with which the HVAC unit is able to maintain a requested temperature setpoint for the bus road profile.

12. The method of claim 11, wherein the HVAC unit is a first HVAC unit, further including comparing the maximal allowed heat load of the first HVAC unit with a maximal allowed heat load of a second HVAC unit for the same bus road profile.

13. The method of claim 1, further including the step of modifying the volume of the testing system to simulate a bus internal volume.

14. A method for determining the energy consumption of a bus heating, ventilating, and air conditioning (HVAC) unit using a testing system having a volume simulating a bus internal volume, the HVAC unit including a refrigerant compressor and a fan for moving air, the refrigerant compressor configured to operate at one or more rotational speeds, the one or more rotational speeds corresponding to a multiple of one or more tested bus engine speeds, the testing system operable to apply one or more testing heat loads to the simulated bus internal volume during a test period, and wherein the HVAC unit includes an automatic temperature control mode in which the refrigerant compressor is on for a portion of the test period and off for a portion of the test period, the method comprising:
operating the HVAC unit for the test period in the automatic temperature control mode;
measuring power consumed by the compressor at one or more testing heat loads at one or more rotational speeds;
determining an association between the measured power consumed by the compressor at the one or more testing heat loads and one or more tested bus engine speeds;
calculating power consumed by the compressor at the one or more testing heat loads at a plurality of profiled bus engine speeds based on the association, wherein the plurality of profiled bus engine speeds is derived from a bus road profile of known bus engine speeds at known time durations, the known time durations summing to a time period; and
calculating energy consumed by the compressor at the one or more testing heat loads over the time period.

15. The method of claim 14, wherein the one or more testing heat loads includes at least two testing heat loads.

16. The method of claim 14, wherein the HVAC unit has a rated nominal cooling capacity at a maximum rotational speed of the compressor, and wherein each of the one or more testing heat loads represents a percentage of the rated nominal cooling capacity between about 20% of the rated nominal cooling capacity and about 80% of the rated nominal cooling capacity.

17. The method of claim 14, further including the steps of:
measuring power consumed by the fan at the one or more testing heat loads at each of the one or more rotational speeds;
determining an association between the measured power consumed by the fan at the one or more testing heat loads and the one or more tested bus engine speeds;
calculating power consumed by the fan at the one or more testing heat loads at the plurality of profiled bus engine speeds based on the association; and
calculating energy consumed by the fan at the one or more testing heat loads over the time period.

18. The method of claim 17, further including the step of calculating energy consumed as the energy consumed by the compressor and the energy consumed by the fan.

19. The method of claim 18, further including the step of calculating a unit of time energy consumed as the energy consumed over a unit of time.

20. The method of claim 19, further including the step of calculating, from the unit of time energy consumed, a unit of time HVAC unit fuel consumption.

21. The method of claim 20, further including calculating a specific unit of time fuel consumption by dividing the unit of time HVAC unit fuel consumption by one of the one or more testing heat loads.

22. The method of claim 21, wherein the HVAC unit is a first HVAC unit, further including comparing the specific unit of time fuel consumption of the first HVAC unit with a specific unit of time fuel consumption of a second HVAC unit at the same one of the one or more testing heat loads.

23. The method of claim 14, further including the step of modifying the volume of the testing system to simulate a bus internal volume.

\* \* \* \* \*